(12) United States Patent
Nordbruch

(10) Patent No.: US 11,069,243 B2
(45) Date of Patent: Jul. 20, 2021

(54) METHOD FOR WARNING A VULNERABLE ROAD USER

(71) Applicant: Robert Bosch GmbH, Stuttgart (DE)

(72) Inventor: Stefan Nordbruch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/025,141

(22) Filed: Sep. 18, 2020

(65) Prior Publication Data
US 2021/0090439 A1  Mar. 25, 2021

(30) Foreign Application Priority Data

Sep. 23, 2019  (DE) .......................... 102019214431.4

(51) Int. Cl.
*G08G 1/16* (2006.01)
*H04W 4/40* (2018.01)

(52) U.S. Cl.
CPC .............. *G08G 1/166* (2013.01); *H04W 4/40* (2018.02)

(58) Field of Classification Search
CPC ......... G08G 1/166; G08G 1/163; H04W 4/40; H04W 8/22; G08B 21/0247
See application file for complete search history.

(56) References Cited

U.S. PATENT DOCUMENTS

| | | | | |
|---|---|---|---|---|
| 8,547,249 B2* | 10/2013 | David | ..................... | G08G 1/166 340/903 |
| 2009/0002197 A1* | 1/2009 | Cemper | ................. | G08B 21/22 340/989 |
| 2011/0001635 A1* | 1/2011 | Akens | ..................... | G08G 1/052 340/936 |
| 2012/0265977 A1* | 10/2012 | Ewell, Jr. | .............. | G06F 1/1694 713/100 |
| 2014/0004840 A1* | 1/2014 | Ewell, Jr. | ................ | G06F 3/013 455/418 |

(Continued)

FOREIGN PATENT DOCUMENTS

| DE | 102017122084 A1 | 3/2018 |
|---|---|---|
| DE | 102016226051 A1 | 6/2018 |

(Continued)

*Primary Examiner* — Munear T Akki
(74) *Attorney, Agent, or Firm* — Norton Rose Fulbright US LLP; Gerard Messina

(57) ABSTRACT

A method for warning a vulnerable road user. The method includes: receiving surroundings signals, which represent a surroundings of the road user and the road user, receiving communication address signals, which represent a communication address of a mobile communication device, which the road user is carrying, ascertaining on the basis of the surroundings signals whether there is an imminent danger to the road user, in the event of an imminent danger to a road user, generating communication message signals, which represent a communication message for the mobile communication device that is to be transmitted to the communication address of the mobile communication device, the communication message comprising a warning to the road user, outputting the generated communication message signals in order to transmit the communication message to the communication address of the mobile communication device. A device, a computer program, and a machine-readable storage medium, are also described.

7 Claims, 2 Drawing Sheets

(56) References Cited

U.S. PATENT DOCUMENTS

2018/0290590 A1\* 10/2018 Goldman-Shenhar ........................
B60Q 1/506

FOREIGN PATENT DOCUMENTS

| DE | 102017200842 A1 | 7/2018 |
| DE | 102018000303 A1 | 8/2018 |
| DE | 102018107756 A1 | 10/2018 |
| DE | 102017214258 A1 | 2/2019 |

\* cited by examiner

METHOD FOR WARNING A VULNERABLE ROAD USER

CROSS REFERENCE

The present application claims the benefit under 35 U.S.C. § 119 of German Patent Application No. DE 102019214431.4 filed on Sep. 23, 2019, which is expressly incorporated herein by reference in its entirety.

FIELD

The present invention relates to a method for warning a vulnerable road user. The present invention further relates to a device, to a computer program and to a machine-readable storage medium.

BACKGROUND INFORMATION

German Patent Application No. DE 10 2017 214 258 A1 describes a safety system for an electric bicycle.

German Patent Application No. DE 10 2018 000 303 A1 describes a method and a system for considering safety aspects with respect to the operation of a vehicle in a surroundings with vulnerable road users.

German Patent Application No. DE 10 2018 107 756 A1 describes systems for outputting a warning signal from a vehicle in order to warn entities nearby.

SUMMARY

An object of the present invention includes providing a way for for efficiently warning a vulnerable road user.

This objective may be achieved by the example embodiments of the present invention. Advantageous developments of the present invention are described herein.

According to a first aspect of the present invention, a method for warning a vulnerable road user is provided. In accordance with an example embodiment of the present invention, the method includes the following steps:

receiving surroundings signals, which represent a surroundings of the road user and the road user, receiving communication address signals, which represent a communication address of a mobile communication device, which the road user is carrying, ascertaining on the basis of the surroundings signals whether there is an imminent danger to the road user, in the event of an imminent danger to the road user, generating communication message signals, which represent a communication message for the mobile communication device that is to be transmitted to the communication address of the mobile communication device, the communication message comprising a warning to the road user, outputting the generated communication message signals in order to transmit the communication message to the communication address of the mobile communication device.

According to a second aspect of the present invention, a device is provided, which is designed to perform all steps of the method according to the first aspect.

According to a third aspect of the present invention, a computer program is provided, which comprises commands, which prompt a computer, for example the device according to the second aspect, when executing the computer program, to implement a method according to the first aspect.

According to a fourth aspect of the present invention, a machine-readable storage medium is provided, on which the computer program according to the third aspect is stored.

In accordance with the present invention, the above object may be achieved in that in the event of an imminent danger to the road user a warning to the road user is transmitted to his mobile communication device via a communication network, in particular via a wireless communication network, for example a mobile telephony network and/or WLAN communication network. This yields in particular the technical advantage of making it possible to warn the road user remotely in an efficient manner.

That is to say in particular that the communication message may be transmitted to the mobile communication device by an infrastructure for example, the road user being located within this infrastructure.

That is to say in particular that the road user, while he is located in the infrastructure, is monitored by the infrastructure to determine whether he is imminently in danger due to his behavior and/or a behavior of additional road users in the environment or in the surroundings of the vulnerable road user. If this is the case, the vulnerable road user is warned via his mobile communication device.

This may yield, for example, the technical advantage that the vulnerable road user himself is able to react to the imminent danger.

Thus, the vulnerable road user is able to perform an action for example in order to minimize and/or avert the imminent danger.

All in all, the technical advantage is thus produced of warning a vulnerable road user efficiently.

A vulnerable road user in the sense of the description designates in particular a road user, who is not protected by a shell, for example a vehicle body. A vulnerable road user is thus for example a pedestrian, a bicycle rider, a scooter rider, a kick scooter rider or a powered two-wheeler rider, in particular a moped rider or a motorcycle rider.

That is to say in particular that the vulnerable road user is for example an element selected from the following group of vulnerable road users: pedestrian, bicycle rider, powered two-wheeler rider, moped rider, motor cycle rider, kick scooter rider, scooter rider.

The following may be used below as an abbreviation for the vulnerable road user: "VRU".

A protective shell may be a driver's cab, for example.

Vulnerable road users normally bear a greater risk of being injured or killed since they are not surrounded by a protective shell.

Providing for efficiently warning a vulnerable road user thus makes it possible to reduce or eliminate a corresponding risk for the vulnerable road user of being injured or killed.

If the singular is used for the vulnerable road user, the plural should always be understood to be included as well and vice versa. Explanations given in connection with one vulnerable road user apply analogously to multiple vulnerable road users and vice versa.

That is to say in particular that it is also possible to warn multiple vulnerable road users in accordance with the present invention described herein.

A mobile communication device in the sense of the description is for example one of the following mobile communication devices: mobile telephone, for example a smartphone, tablet, a smartwatch.

A mobile communication device is for example integrated into a piece of clothing or is comprised by the latter. Such a piece of clothing may also be called smart clothing.

A mobile communication device is for example integrated into a pair of glasses or is comprised by the latter. The pair of eyeglasses comprises for example eyeglasses having an integrated display screen. The warning may be displayed visually in an advantageous manner on such a display screen.

A mobile communication device is designed for example to be implanted into a human being. The vulnerable road user may thus have for example an implanted mobile communication device.

A mobile communication device is for example integrated into jewelry, for example a ring, or is comprised by it.

The mobile communication device is carried for example by the vulnerable road user.

It is provided for example that the mobile communication device is situated on a vehicle controlled by the vulnerable road user.

It is provided for example that the mobile communication device is implemented and/or integrated in the vehicle.

It is provided for example that the mobile communication device is comprised by the vehicle.

The mobile communication device may be formed for example as a so-called "connectivity unit," that is, as a connection or communication unit of the vehicle.

The mobile communication device is integrated for example in a main control unit of the vehicle or in a control unit of the vehicle.

Multiple mobile communication devices are provided for example. For example, a first mobile communication device may be comprised by the vehicle and a second mobile communication device may be comprised for example by the vulnerable road user or be carried by the latter.

Explanations given in connection with one mobile communication device apply analogously to multiple communication devices and vice versa.

A vehicle in the sense of the description is for example one of the following vehicles: motorcycle, bicycle, scooter, electric scooter, electric bicycle, generally a powered two-wheeler or motor vehicle, two-wheeler, kick scooter, moped.

One specific embodiment provides for the vulnerable road user to control a vehicle.

It is provided for example that the vehicle comprises a motor. The motor is for example an electric motor or an internal combustion engine, for example.

The vehicle comprises for example multiple motors, for example an internal combustion engine and an electric motor.

The vehicle is designed for example to be controlled in at least partially automated fashion. That is to say in particular that a lateral and/or longitudinal guidance of the vehicle may be controlled at least in partially automated fashion.

One specific embodiment of the present invention provides that, in the event of an imminent danger to the road user, an action instruction is ascertained for the road user on the basis of the surroundings signals in order to reduce an endangerment by the imminent danger to the road user, the communication message comprising the action instruction.

This may yield, for example, the technical advantage of being able to provide the road user efficiently with an action instruction, which, in the event that the road user follows the action instruction, may make it possible efficiently to reduce an endangerment by the imminent danger to the road user.

The reduction of the endangerment is to be seen in particular relative to the case in which the road user himself undertakes no actions to reduce the endangerment.

One specific embodiment of the present invention provides that, in the event of an imminent danger to the road user, control commands for controlling the mobile communication device are ascertained in such a way that, when the mobile communication device is controlled on the basis of the control commands, the mobile communication device outputs the communication message via a loudspeaker of the mobile communication device at maximum volume and/or the mobile communication device emits a ring tone at maximum volume and/or the warning is indicated on a display screen of the mobile communication device (407) and/or the mobile communication device vibrates.

This may yield, for example, the technical advantage that the communication message, that is, in particular the warning, may be output acoustically in an efficient manner. The fact that the latter is output at a maximum volume or that the mobile telecommunication device emits a ring tone at maximum volume yields for example the technical advantage that the vulnerable road user is potentially able to notice this communication message or the ring tone even in the event of ambient noise.

One specific embodiment of the present invention provides that, in the event of an imminent danger to the road user, control commands for controlling the mobile communication device are ascertained in such a way that, when the mobile communication device is controlled on the basis of the control commands, the mobile communication device outputs the warning visually and/or acoustically and/or haptically.

One specific embodiment of the present invention provides that, in the event of an imminent danger to the road user and in the event that the road user controls a vehicle driven by a motor, remote control signals for controlling a lateral and/or longitudinal guidance of the vehicle are generated in such a way that, when the lateral and/or longitudinal guidance of the vehicle is controlled on the basis of the remote control signals, the vehicle performs a driving maneuver that reduces an endangerment by the imminent danger to the road user, the remote control signals being output in the process.

This may yield, for example, the technical advantage of allowing the endangerment by the imminent danger to the road user to be reduced efficiently.

Here too, the reduction is to be seen in particular relative to the case in which the road user himself does not perform any actions.

One specific embodiment of the present invention provides for the at least one safety condition to be respectively an element selected from the following group of safety conditions:

existence of a predetermined safety integrity level (SIL) or automotive safety integrity level (ASIL) of at least the vehicle and the infrastructure, in particular including a communication link and/or communication components, in particular with respect to the overall systems in the vehicle and infrastructure and in particular parts, e.g. components, algorithms, interfaces, etc., existence of a maximum latency of a communication between the mobile communication device and/or the vehicle and the infrastructure, existence of a predetermined computer protection level of a device for performing the steps of the method according to the first aspect, existence of predetermined components and/or algorithms and/or communication options that are used for performing the steps of the method according to the first aspect, existence of a redundancy and/or diversity in predetermined components and/or algorithms and/or communication options that are used for performing the steps of the method according to the first aspect, existence of predetermined availability information, which indicates an availability of predetermined components and/or algorithms and/or communication options, existence of predetermined quality criteria of the predetermined components and/or algorithms and/or communication options, existence of a plan which comprises measures for reducing errors and/or measures in the event of failures of predetermined components and/or algorithms and/or communication options and/or measures for misdiagnoses and/or measures in the event of misinterpretations, existence of one or multiple fallback scenarios, existence of a predetermined function, existence of a predetermined traffic situation, existence of a predetermined weather, maximally possible time for a respective performance and/or execution of a step or of multiple steps of the method according to the first aspect, existence of a result of a check to determine that elements and/or functions, which are used for carrying out the method according to the first aspect, currently function in a faultless manner.

A communication link is for example a communication link between the device according to the second aspect and the motor vehicle and/or the mobile communication device. A communication link comprises for example one or multiple communication channels.

In one specific embodiment of the present invention, a component, which is used to carry out the method according to the first aspect, is an element selected from the following group of components: environment sensor, vehicle, infrastructure, device according to the second aspect, vehicle system, in particular drive system, clutch system, brake system, driver assistance system, communication interface of the vehicle and/or of the infrastructure, processor, input, output of the device according to the second aspect, control unit, in particular main control unit of the vehicle.

A computer protection level defines in particular the following:

activated firewall and/or valid encryption certificate for encrypting a communication between the vehicle and/or the mobile communication device and the infrastructure and/or activated virus program having updated virus signatures and/or existence of a protection, in particular a mechanical protection, in particular a break-in protection, of the computer, in particular of the device according to the second aspect, and/or existence of a possibility for checking that signals, in particular infrastructure data signals, were transmitted correctly, that is, error-free.

An algorithm comprises, for example, the computer program according to the third aspect.

The fact that in particular a check is performed to determine that there exists a redundancy and/or diversity in predetermined components and/or algorithms and/or communication options may yield, for example, the technical advantage that even in the event of a failure of the respective component, for example a computer, and/or of the corresponding algorithm and/or of the corresponding communication option, it is nevertheless possible to execute a safe function.

To ensure that results are correct, it is possible in one specific embodiment to calculate these results multiple times for example and to compare the respective results with one another. Only if there is agreement among the results is it determined for example that the results are correct. If multiple times is an uneven number, it may be provided for example that a determination is made that the result corresponding to the highest number of identical results is correct.

One specific embodiment of the present invention provides for one or multiple method steps to be documented, in particular documented in a blockchain.

This may yield, for example, the technical advantage of allowing the method to be analyzed even after its implementation or execution, on the basis of the documentation. The documentation in a blockchain in particular has the technical advantage that the documentation is secured against manipulation and forgery.

A blockchain (also block chain) is a continuously expandable list of data sets, called "blocks", which are linked to one another by one or multiple cryptographic methods. Each block contains in particular a cryptographically secure hash (erratic value) of the preceding block, in particular a time stamp and in particular transaction data.

One specific embodiment of the present invention provides for a check to be performed to determine whether a totality made up of the vehicle and/or mobile communication device and of infrastructure involved in the method according to the first aspect including a communication between infrastructure and vehicle is secure so that the vehicle and/or a local and/or a global infrastructure and/or a communication between vehicle and infrastructure are checked accordingly.

This thus means, in particular, that the components used in the implementation of the method according to the first aspect are checked for safety, that is, whether they fulfill specific safety conditions, before the road user may be warned and/or before the vehicle may be controlled remotely.

Important and/or dependent criteria are, for example, one or several of the safety conditions described above.

In the sense of the description, "safe" means in particular "safe" and "secure." These two English terms are normally translated into German as "sicker." In English, however, they have in part a different meaning.

The term "safe" pertains in particular to the topic of accident and accident avoidance. A warning and/or a remote control that is "safe" is in particular one in which a probability of an accident or a collision is smaller than or smaller than/equal to a predetermined probability threshold value.

The term "secure" pertains in particular to the topic of computer protection or hacker protection, that is, in particular to how well a (computer) infrastructure and/or a communication infrastructure, in particular a communication link between the vehicle and/or the mobile communication device and a device according to the second aspect, is secured against unauthorized access and/or against data manipulations by third parties ("hackers").

A warning and/or a remote control that is "secure" is thus in particular based on an appropriate and sufficient computer protection and/or hacker protection.

In one specific embodiment of the present invention, an area is defined, which is monitored by one or multiple environment sensors.

A vulnerable road user may also be abbreviated below as "VRU".

An exemplary application case may for example comprise one or several of the following specific embodiments and/or features and/or examples:

One specific embodiment of the present invention provides for the vulnerable road user to drive or move into an area that is monitored by one or multiple environment sensors.

In one specific embodiment of the present invention, it is determined that the VRU is moving or driving into the area.

Information signals are received for example, which represent information that the VRU is driving toward the area. The information signals are transmitted for example from the mobile communication device and/or from the vehicle of the VRU. Based on the information signals, a determination is made for example that the VRU is driving toward the area or is moving toward the area. The vehicle and/or the mobile communication device for example emit(s) a signal and are/is thereby detected. That is to say in particular that the vehicle and/or the communication device are/is able to emit a signal, for example a position signal. It is provided for example that a determination is made in response to such a signal that the VRU is driving toward the area or is moving toward the area.

The surroundings signals are processed for example, in particular by the infrastructure, in order to detect a vehicle of a VRU driving toward the area and/or to detect the VRU moving toward the area. The vehicle may be detected via its license plate for example. Processing the surroundings signals comprises in particular a license number detection. The infrastructure is able to detect the VRU and/or its vehicle for example by using at least one visual environment sensor, in particular video sensor.

For example, the vehicle and/or the mobile communication device have/has a communication link to the infrastructure or a communication link is (automatically) established to the infrastructure ahead of the area.

The infrastructure comprises for example the device according to the second aspect.

The mobile communication device may be comprised by the vehicle for example. The vehicle comprises for example a mobile communication device and the road user also comprises a mobile communication device for example. Two mobile communication devices may thus be provided for example: A first mobile communication device is carried by the road user and a second mobile communication device is comprised by the vehicle, it being in particular integrated or installed in the latter.

The VRU is localized for example, that is, the position of the VRU is determined.

Data are transmitted from the mobile communication device for example automatically/for example in response to a query. Data comprise for example position data, in particular GPS data, and/or speed data.

A position of the VRU and/or the direction of movement of the VRU is, in particular regularly, detected further and/or predicted, for example.

For example, a traffic situation is analyzed, in particular by the construction site infrastructure, in particular by the device according to the second aspect.

The analysis of the traffic situation comprises for example a processing of data transmitted by further road users, in particular motor vehicles, for example position data and/or speed data, and/or a processing, for example a visual evaluation, of the environment sensor data of the environment sensors of the infrastructure.

The infrastructure analyzes for example the traffic situation to determine whether a danger is imminent to the VRU.

If an imminent danger to the VRU is ascertained, then, according to one specific embodiment, at least one of the following actions is triggered and/or steps performed:

The VRU is informed and/or warned.

For example, an intervention in the operation of the vehicle of the VRU is performed remotely. That is to say for example that a lateral and/or longitudinal guidance of the vehicle may be controlled remotely. For example, the vehicle is braked remotely, in particular stopped. Depending on the analysis of the traffic situation, in addition or instead of the remote braking, a remote evasion, for example of an obstacle, and/or an acceleration may be provided as exemplary steps.

For example, additional road users, in particular motor vehicles, in the environment of the VRU are informed about the imminent danger to the VRU. The information is provided for example via V2I communication systems. The information is provided for example via information systems that are external to road users, in particular external to motor vehicles, for example signs and/or audio systems.

If a further road user is a motor vehicle capable of being controlled remotely, an intervention is performed remotely in an operation of the remote-controllable motor vehicle for example. That is to say for example that a lateral and/or longitudinal guidance of the remote-controllable motor vehicle may be controlled remotely. For example, the remote-controllable motor vehicle is braked remotely, in particular stopped. Depending on the analysis of the traffic situation, in addition or instead of the remote braking, a remote evasion, for example of an obstacle, and or an acceleration may be provided as exemplary steps.

For example, a traffic guidance system comprising for example traffic systems, in particular traffic lights and/or display systems, is used, that is, controlled, in order to neutralize or reduce the imminent danger to the road user.

The steps of the method are preferably documented in a forgery-proof and comprehensible manner, in particular in a blockchain.

One specific embodiment of the present invention provides that on the one hand the overall system (vehicle and/or mobile communication device, infrastructure, communication link, cloud . . . ) is checked with respect to the at least one safety condition.

One specific embodiment of the present invention provides that the individual parts are also checked with respect to the at least one safety condition being fulfilled. This in particular prior to controlling the vehicle remotely.

In one specific embodiment of the present invention, the step(s) of checking is/are performed inside the vehicle and/or by the mobile communication device and/or outside the vehicle and/or external to the mobile communication device, in particular in an infrastructure.

One specific embodiment of the present invention provides for the step(s) of checking to be re-checked subsequently, that is, at a later point in time, for example regularly. For example, the step(s) of checking is/are re-checked subsequently at a predetermined frequency, for example every 100 ms.

This re-checking, that is, the re-checking to determine whether the at least one safety condition is fulfilled, occurs according to one specific embodiment prior to and/or after and/or during one or several predetermined method steps.

According to one specific embodiment of the present invention, the re-checking is performed or executed in the event of problems.

The formulation "driving in at least partially automated fashion" comprises one or several of the following cases: assisted driving, partially automated driving, highly automated driving, fully automated driving.

Assisted driving means that a driver of the vehicle, in particular of the motor vehicle, permanently performs either the lateral or the longitudinal guidance of the motor vehicle. The respectively other driving task (that is, controlling the longitudinal or the lateral guidance of the vehicle, in particular of the motor vehicle) is performed automatically. That is to say that in assisted driving of the vehicle, in particular of the motor vehicle, either the lateral guidance or the longitudinal guidance is controlled automatically.

Partially automated driving means that in a specific situation (for example: driving on a freeway, driving within a parking facility, passing an object, driving within a traffic lane, which is defined by lane markers) and/or for a certain time period a longitudinal guidance and a lateral guidance of the vehicle, in particular of the motor vehicle, are controlled automatically. It is not necessary for a driver of the vehicle, in particular of the motor vehicle, to control the longitudinal and lateral guidance of the motor vehicle manually. Nevertheless, the driver must permanently monitor the automatic control of the longitudinal and lateral guidance so as to be able to intervene manually when necessary. The driver must always be prepared to take complete control of driving the vehicle, in particular of driving the motor vehicle.

Highly automated driving means that for a certain time period in a specific situation (for example: driving on a freeway, driving within a parking facility, passing an object, driving within a traffic lane, which is defined by lane markers) a longitudinal guidance and a lateral guidance of the vehicle, in particular of the motor vehicle, are controlled automatically. It is not necessary for a driver of the vehicle, in particular of the motor vehicle, to control the longitudinal and lateral guidance of the motor vehicle manually. It is not necessary for the driver permanently to monitor the automatic control of the longitudinal and lateral guidance so as to be able to intervene manually when necessary. When necessary, a takeover request is automatically output to the driver for taking over the control of the longitudinal and lateral guidance, in particular with sufficient time to respond. Thus, the driver must be potentially able to take control of longitudinal and lateral guidance. Limits of the automatic control of the lateral and longitudinal guidance are detected automatically. In highly automated driving, it is not possible in every initial situation to bring about a risk-minimized state automatically.

Fully automated driving means that in a specific situation (for example: driving on a freeway, driving within a parking facility, passing an object, driving within a traffic lane, which is defined by lane markers) a longitudinal guidance and a lateral guidance of the vehicle, in particular of the motor vehicle, are controlled automatically. It is not necessary for a driver of the vehicle, in particular of the motor vehicle, to control the longitudinal and lateral guidance of the vehicle, in particular of the motor vehicle, manually. It is not necessary for the driver to monitor the automatic control of the longitudinal and lateral guidance so as to be able to intervene manually when necessary. Prior to a termination of the automatic control of the lateral and longitudinal guidance, a request is automatically output to the driver to take over the task of driving (controlling the lateral and longitudinal guidance of the vehicle, in particular of the motor vehicle), in particular with sufficient time to respond. If the driver does not take over the task of driving, the motor vehicle is automatically returned to a risk-minimized state. Limits of the automatic control of the lateral and longitudinal guidance are detected automatically. In all situations it is possible to return the motor vehicle automatically to a risk-minimized system state.

The vulnerable road user, if he controls a vehicle, may also be called a driver of the vehicle.

One specific embodiment of the present invention provides for the method according to the first aspect to be a computer-implemented method.

One specific embodiment of the present invention provides for the method according to the first aspect to be carried out or implemented using the device according to the second aspect.

Device features result analogously from corresponding method features and vice versa. That is to say in particular that technical functionalities of the device according to the second aspect analogously result from corresponding technical functionalities of the method according to the first aspect and vice versa.

The formulation "at least one" stands in particular for "one or several."

Exemplary embodiments of the present invention are illustrated in the figures and are explained in greater detail below.

DETAILED DESCRIPTION OF EXAMPLE EMBODIMENTS

Figure 1:
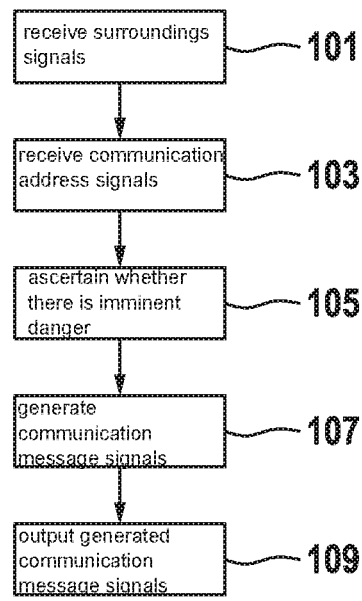
FIG. 1 shows a flow chart of a method for the safe execution of a function provided by a motor vehicle in accordance with an example embodiment of the present invention.

FIG. 1 shows a flow chart of an example method in accordance with the present invention for warning a vulnerable road user, comprising the following steps:

receiving 101 surroundings signals, which represent a surroundings of the road user and the road user, receiving 103 communication address signals, which represent a communication address of a mobile communication device, which the road user is carrying, ascertaining 105 on the basis of the surroundings signals whether there is an imminent danger to the road user, in the event of an imminent danger to the road user, generating 107 communication message signals, which represent a communication message for the mobile communication device that is to be transmitted to the communication address of the mobile communication device, the communication message comprising a warning to the road user, outputting 109 the generated communication message signals in order to transmit the communication message to the communication address of the mobile communication device.

According to one specific embodiment of the present invention, the communication address comprises for example an IP address.

According to one specific embodiment of the present invention, the communication address comprises an IMEI number. IMEI stands for "International Mobile Equipment Identity" and indicates a unique 15-digit serial number, on the basis of which the mobile communication device may be uniquely identified.

According to one specific embodiment of the present invention, the method according to the first aspect comprises a transmission of the communication message or of the communication message signals to the communication address of the mobile communication device via a communication network.

A communication network comprises for example a wireless communication network, for example a WLAN communication network and/or a mobile telephony network.

According to one specific embodiment of the present invention, the method according to the first aspect comprises remote-controlling a lateral and/or longitudinal guidance of the vehicle based on the remote control signals.

In one specific embodiment of the present invention, the method according to the first aspect comprises controlling the mobile communication device on the basis of the control commands.

Figure 2:
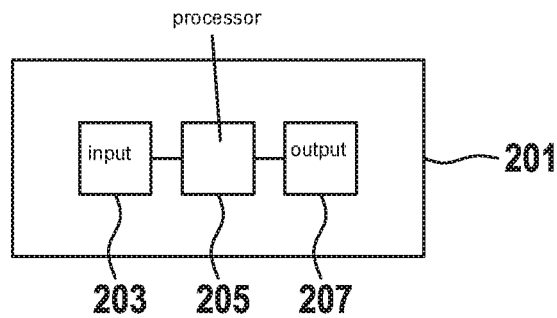
FIG. 2 shows a device in accordance with an example embodiment of the present invention.

FIG. 2 shows a device 201, which is designed to perform all steps of the method according to the first aspect of the present invention.

Device 201 comprises an input 203, which is designed to receive the surroundings signals and the communication address signals.

Device 201 comprises a processor 205, which is designed to ascertain on the basis of the surroundings signals whether there is an imminent danger to the road user.

Processor 205 is further designed, in the event of an imminent danger to the road user, to generate communication message signals, which represent a communication message for the mobile communication device that is to be transmitted to the communication address of the mobile communication device, the communication message comprising a warning to the road user.

Device 201 comprises an output 207, which is designed to output the generated communication message signals in order to transmit the communication message to the communication address of the mobile communication device.

For example, output 207 has a communication link to a wireless communication interface (not shown), which is designed to transmit the communication message or the communication message signals via a wireless communication network to the communication address of the mobile communication device.

Signals that are received are generally received via input 203. Input 203 is thus designed in particular to receive the respective signals.

It is provided for example that signals that are output are output by way of output 207. That is to say in particular that output 207 is in particular designed to output the respective signals.

According to one specific embodiment of the present invention, processor 205 is designed to execute or perform the step, described above and/or below, of ascertaining the action instruction and/or the step of ascertaining the control commands for controlling the mobile communication device and/or the generation of the remote control signals and/or the check to determine whether the at least one safety condition is fulfilled.

For example, processor 205 is designed to perform or execute the step of documenting one or multiple method steps.

In a specific embodiment of the present invention that is not shown, multiple processors are provided instead of the one processor 205.

According to one specific embodiment of the present invention, a remote control device (not shown) is provided, which is designed to remote-control or control a lateral and/or longitudinal guidance of the vehicle based on the remote control signals.

Figure 3:
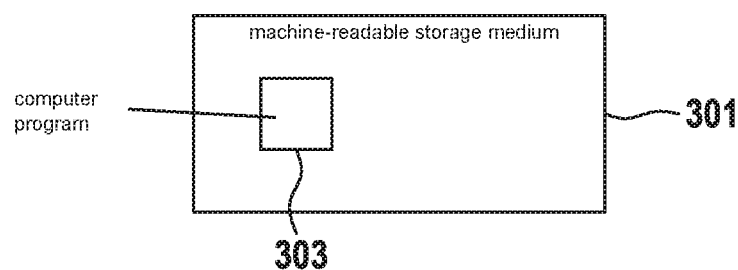
FIG. 3 shows a machine-readable storage medium in accordance with an example embodiment of the present invention.

FIG. 3 shows a machine-readable storage medium 301 in accordance with an example embodiment of the present invention.

A computer program 303 is stored on machine-readable storage medium 301. The computer program 303 comprises commands that prompt a computer, for example device 201 shown in FIG. 2, when executing the computer program 303, to implement a method according to the first aspect of the present invention.

Figure 4:
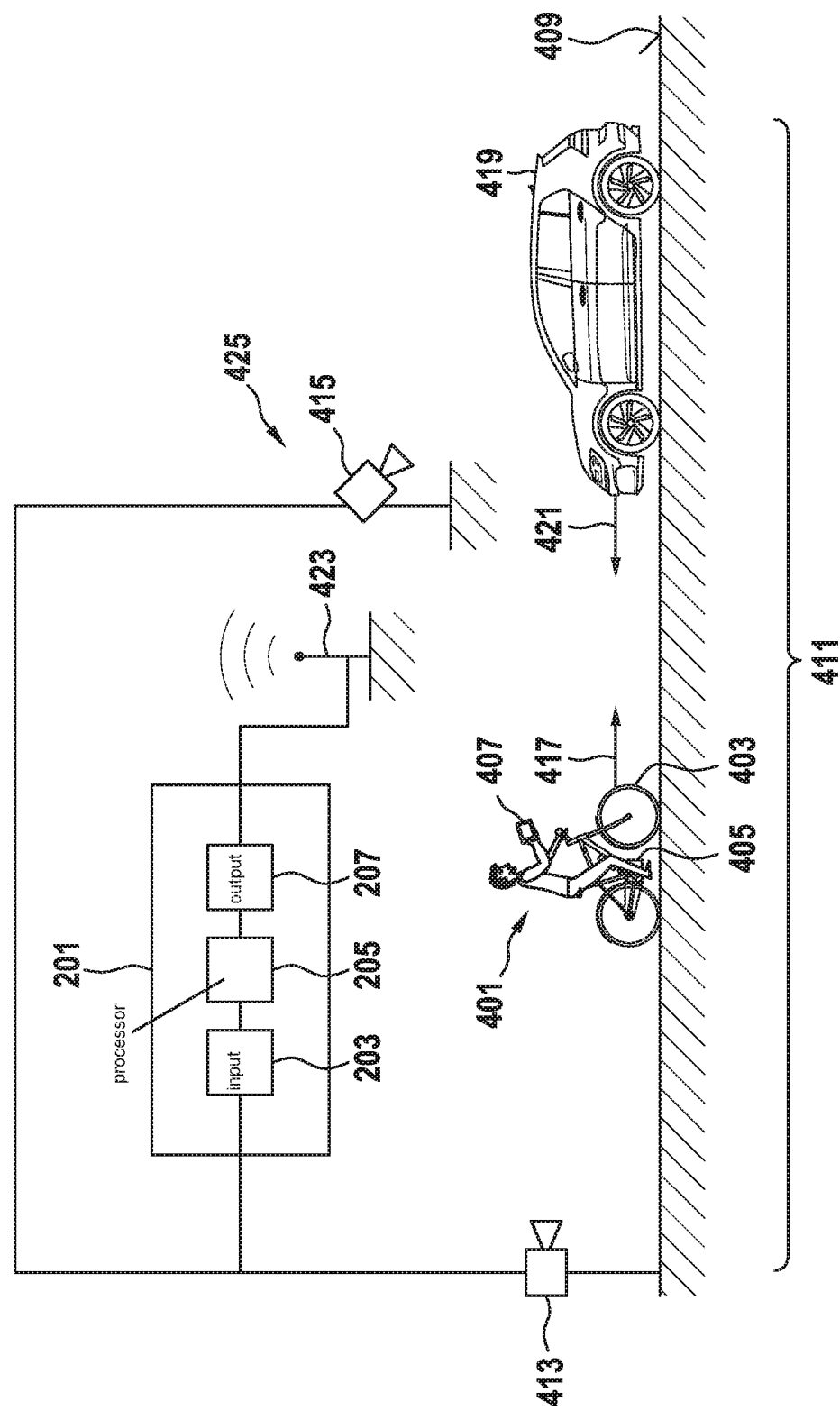
FIG. 4 shows a road user in accordance with an example embodiment of the present invention.

FIG. 4 shows a road user 401 in accordance with an example embodiment of the present invention.

Road user 401 rides an electric bicycle 403 comprising an electric motor 405.

Road user 401 is thus a vulnerable road user in the sense of this description.

Road user 401 comprises or carries a mobile communication device 407.

Road user 401 rides his electric bicycle 403 on a road 409.

An area 411 of road 409 is specified or defined, which is monitored by a first video camera 413 comprising a video sensor (not shown) and a second video camera 415 comprising a video sensor (not shown).

A direction of travel of electric bicycle 403 is indicated by an arrow having reference numeral 417, the direction of travel running from left to right relative to the paper plane.

A motor vehicle 419 is also traveling on road 409, a direction of travel of motor vehicle 419 being indicated by an arrow having reference numeral 421. The direction of travel 421 of motor vehicle 419 runs from right to left relative to the paper plane.

Road user 401 is thus on a collision course with motor vehicle 419.

A specific embodiment (not shown) may provide for further environment sensors, in addition or instead of the two video cameras 413, 415, each comprising a video sensor, which monitor area 411.

According to one specific embodiment of the present invention, an environment sensor in the sense of the description is for example one of the following environment sensors: radar sensor, video sensor, infrared sensor, magnetic field sensor, ultrasonic sensor and lidar sensor.

Furthermore, device 201 as shown in FIG. 2 is provided.

The video signals of video cameras 413, 415 are provided to input 203 of device 201.

These video signals thus form the surroundings signals in the present exemplary embodiment of the present invention.

If for example further environment sensors are provided, for example a radar sensor, surroundings signals in the sense of the description may comprise corresponding environment sensor signals, in particular radar signals, in addition to the video signals of the video sensors.

Processor 205 thus ascertains on the basis of the video signals that road user 401 is on a collision course with motor vehicle 419.

Accordingly, it then generates a communication message or corresponding communication message signals, the communication message comprising a warning to road user 401.

These generated communication message signals are output via output 207 to a wireless communication interface 423.

The latter transmits the communication message via a wireless communication network to mobile communication device 407 of road user 401.

For example, mobile communication device 407 is configured or set in such a way that in response to the reception of a communication message a signal, for example a haptic and/or an optical and/or an acoustic signal, is output.

Road user 401 is thus efficiently able to become cognizant of the warning and to change its course for example, to perform an evasive maneuver for example.

For example, processor 205 may also generate a corresponding warning to a driver of motor vehicle 419 and output it via output 207. Wireless communication interface 423 is then able to transmit this warning also to the driver of motor vehicle 419 so that the driver is also able to perform an evasive maneuver. It is possible for example to transmit also an action instruction to the driver of motor vehicle 419 via the wireless communication network.

If motor vehicle 419 is capable of being controlled remotely, there may be a provision for example for processor 205 to generate corresponding motor vehicle remote control commands for remote-controlling a lateral and/or longitudinal guidance of motor vehicle 419 and to output these via output 207. These motor vehicle remote control signals are transmitted via wireless communication interface 423 to motor vehicle 419 in order to control the latter remotely. Based on a corresponding remote control, it is thus also possible for motor vehicle 419 to perform an evasive maneuver in remote controlled fashion or to stop in remote controlled fashion.

If the electric bicycle 403 is capable of being controlled remotely for example, corresponding remote control signals for controlling a lateral and/or longitudinal guidance of the electric bicycle 403 remotely may be generated and output and transmitted to electric bicycle 403 via wireless communication interface 423 in order to control a driving maneuver remotely in such a way that the electric bicycle stops or performs an evasive maneuver for example.

Device 201, first and second video camera 413, 415 and wireless communication interface 423 presently form for example an infrastructure 425 designed to monitor area 411.

According to one specific embodiment of the present invention, for it to be permitted to control motor vehicle 419 and/or electric bicycle 403 remotely for example, at least one safety condition must be fulfilled.

There should be a provision for example that a latency of a communication between wireless communication interface 423 and electric bicycle 403 and/or motor vehicle 419 is less than or equal to a predetermined latency threshold value.

Further exemplary safety conditions that must be fulfilled in order to control motor vehicle 419 and/or electric bicycle 403 remotely and/or generally to warn the road user are described above in exemplary fashion.

What is claimed is:

1. A method for warning a vulnerable road user, comprising the following steps performed by a remote processor:
    receiving surroundings signals which represent a surroundings of the road user;
    receiving communication address signals which represent a communication address of a mobile communication device which the road user is carrying;
    ascertaining, based on the surroundings signals, whether there is an imminent danger to the road user;
    based on ascertaining the imminent danger to the road user, generating communication message signals which represent a communication message for the mobile communication device that is to be transmitted to the communication address of the mobile communication device, the communication message including a warning to the road user; and
    outputting the generated communication message signals to transmit the communication message to the communication address of the mobile communication device;
    wherein, based on the ascertaining of the imminent danger to the road user and based on the road user controlling a vehicle driven by a motor, remote control signals for controlling a lateral and longitudinal guidance of the vehicle are generated in such a way that, when the lateral and longitudinal guidance of the vehicle is controlled based on the remote control signals, the vehicle performs a driving maneuver that reduces an endangerment by the imminent danger to the road user, the remote control signals being output; and
    wherein safety condition signals are received which represent at least one safety condition for the road user to be warned and for the vehicle to be controlled remotely, a check being performed to determine whether the at least one safety condition is fulfilled, the communication message signals and the remote control signals being generated based on a result of the check as to whether the at least one safety condition is fulfilled.

2. The method as recited in claim 1, wherein, based on ascertaining of the imminent danger to the road user, an action instruction is ascertained for the road user, based on the surroundings signals, to reduce an endangerment by the imminent danger to the road user, the communication message including the action instruction.

3. The method as recited in claim 1, wherein, based on ascertaining the imminent danger to the road user, control commands for controlling the mobile communication device are ascertained in such a way that, when the mobile communication device is controlled based on the control commands: (i) the mobile communication device outputs the communication message via a loudspeaker of the mobile communication device at maximum volume, and/or (ii) the mobile communication device emits a ring tone at maximum volume, and/or (iii) a warning is indicated on a display screen of the mobile communication device, and/or (iv) the mobile communication device vibrates.

4. The method as recited in claim 1, wherein the at least one safety condition is respectively an element selected from the following safety conditions:
    (i) existence of a predefined safety integrity level or automotive safety integrity level of at least the vehicle and infrastructure including a communication link and/or communication components;
    (ii) existence of a maximum latency of a communication between the mobile communication device and/or the vehicle and the infrastructure;
    (iii) existence of a predetermined computer protection level of a device for performing the steps of the method;
    (iv) existence of predetermined availability information, which indicates an availability of predetermined components and/or algorithms and/or communication options;
    (v) existence of predetermined quality criteria of the predetermined components and/or algorithms and/or communication options;
    (vi) existence of a plan which includes measures for reducing errors and/or measures in the event of failures of predetermined components and/or algorithms and/or communication options and/or measures for misdiagnoses and/or measures in the event of misinterpretations;
    (vii) existence of one or multiple fallback scenarios;
    (viii) existence of a predetermined function;
    (ix) existence of a predetermined traffic situation;
    (x) existence of a predetermined weather;

(xi) a maximally possible time for a respective implementation and/or execution of one of more of the steps of the method;

(xii) existence of a result of a check to determine that elements and/or functions, which are used for carrying out the method, currently function in a faultless manner.

5. The method as recited in claim 1, wherein one or more of the steps of the method are documented in a blockchain.

6. A device configured to warn a vulnerable road user, the device including a remote processor, the remote processor configured to:

receive surroundings signals which represent a surroundings of the road user;

receive communication address signals which represent a communication address of a mobile communication device which the road user is carrying;

ascertain, based on the surroundings signals, whether there is an imminent danger to the road user;

based on ascertaining the imminent danger to the road user, generate communication message signals which represent a communication message for the mobile communication device that is to be transmitted to the communication address of the mobile communication device, the communication message including a warning to the road user; and output the generated communication message signals to transmit the communication message to the communication address of the mobile communication device;

wherein, based on the ascertaining of the imminent danger to the road user and based on the road user controlling a vehicle driven by a motor, remote control signals for controlling a lateral and longitudinal guidance of the vehicle are generated in such a way that, when the lateral and longitudinal guidance of the vehicle is controlled based on the remote control signals, the vehicle performs a driving maneuver that reduces an endangerment by the imminent danger to the road user, the remote control signals being output; and wherein safety condition signals are received which represent at least one safety condition for the road user to be warned and for the vehicle to be controlled remotely, a check being performed to determine whether the at least one safety condition is fulfilled, the communication message signals and the remote control signals being generated based on a result of the check as to whether the at least one safety condition is fulfilled.

7. A non-transitory machine-readable storage medium on which is stored a computer program for warning a vulnerable road user, the computer program, when executed by a remote processor, causing the remote processor to perform:

receiving surroundings signals which represent a surroundings of the road user;

receiving communication address signals which represent a communication address of a mobile communication device which the road user is carrying;

ascertaining, based on the surroundings signals, whether there is an imminent danger to the road user;

based on ascertaining the imminent danger to the road user, generating communication message signals which represent a communication message for the mobile communication device that is to be transmitted to the communication address of the mobile communication device, the communication message including a warning to the road user; and outputting the generated communication message signals to transmit the communication message to the communication address of the mobile communication device;

wherein, based on the ascertaining of the imminent danger to the road user and based on the road user controlling a vehicle driven by a motor, remote control signals for controlling a lateral and longitudinal guidance of the vehicle are generated in such a way that, when the lateral and longitudinal guidance of the vehicle is controlled based on the remote control signals, the vehicle performs a driving maneuver that reduces an endangerment by the imminent danger to the road user, the remote control signals being output; and wherein safety condition signals are received which represent at least one safety condition for the road user to be warned and for the vehicle to be controlled remotely, a check being performed to determine whether the at least one safety condition is fulfilled, the communication message signals and the remote control signals being generated based on a result of the check as to whether the at least one safety condition is fulfilled.

\* \* \* \* \*